US008533359B2

(12) United States Patent
Gerber et al.

(10) Patent No.: US 8,533,359 B2
(45) Date of Patent: *Sep. 10, 2013

(54) INTERDOMAIN NETWORK AWARE PEER-TO-PEER PROTOCOL

(75) Inventors: Alexandre Gerber, Madison, NJ (US); Jin Wang, Randolph, NJ (US); Oliver Spatscheck, Randolph, NJ (US); Jennifer Yates, Morristown, NJ (US); Michael Merritt, Mendham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 68 days.

This patent is subject to a terminal disclaimer.

(21) Appl. No.: 13/490,683

(22) Filed: Jun. 7, 2012

(65) Prior Publication Data

US 2012/0246308 A1 Sep. 27, 2012

Related U.S. Application Data

(63) Continuation of application No. 12/271,014, filed on Nov. 14, 2008, now Pat. No. 8,219,706.

(51) Int. Cl.
*G06F 15/173* (2006.01)
(52) U.S. Cl.
USPC ........... 709/238; 709/239; 709/240; 709/242; 709/243; 709/244; 709/249
(58) Field of Classification Search
None
See application file for complete search history.

(56) References Cited

U.S. PATENT DOCUMENTS

| | | | |
|---|---|---|---|
| 6,724,733 B1 | 4/2004 | Schuba et al. | |
| 6,820,133 B1 | 11/2004 | Grove et al. | |
| 6,839,769 B2 | 1/2005 | Needham et al. | |
| 6,959,333 B2 | 10/2005 | Beaumont et al. | |
| 7,002,917 B1 * | 2/2006 | Saleh | 370/238 |
| 7,006,453 B1 * | 2/2006 | Ahmed et al. | 370/255 |
| 7,028,083 B2 | 4/2006 | Levine et al. | |
| 7,065,587 B2 | 6/2006 | Huitema et al. | |
| 7,139,242 B2 | 11/2006 | Bays | |
| 7,159,035 B2 * | 1/2007 | Garcia-Luna-Aceves et al. | 709/241 |
| 7,251,688 B2 | 7/2007 | Leighton et al. | |
| 7,260,645 B2 | 8/2007 | Bays | |
| 7,274,658 B2 | 9/2007 | Bornstein et al. | |
| 7,359,985 B2 | 4/2008 | Grove et al. | |
| 7,532,623 B2 * | 5/2009 | Rosenzweig et al. | 370/390 |
| 7,552,233 B2 | 6/2009 | Raju et al. | |
| 7,664,876 B2 | 2/2010 | Garcia-Luna-Aceves et al. | |
| 7,668,146 B2 * | 2/2010 | Levendel et al. | 370/338 |
| 7,697,454 B2 * | 4/2010 | Smith | 370/254 |
| 7,720,996 B2 | 5/2010 | Soles et al. | |
| 7,778,235 B2 * | 8/2010 | Thubert et al. | 370/351 |
| 7,895,345 B2 | 2/2011 | Manion et al. | |
| 2002/0141343 A1 | 10/2002 | Bays | |
| 2002/0141378 A1 | 10/2002 | Bays et al. | |

(Continued)

*Primary Examiner* — Patrice Winder
(74) *Attorney, Agent, or Firm* — Akerman Senterfitt; Michael K. Dixon; Roy Zachariah

(57) ABSTRACT

A method includes receiving network distance information, receiving a request from a client for an identity of a peer providing content, and identifying a first peer and a second peer providing the content. The network distance information includes a compilation of network distance information provided by a plurality of service providers. The method further includes determining that a network distance between the first peer and the client is less than a network distance between the second peer and the client based on the network distance information, and providing the identity of the first peer to the client.

20 Claims, 7 Drawing Sheets

(56) References Cited

U.S. PATENT DOCUMENTS

| | | |
|---|---|---|
| 2002/0143951 A1 | 10/2002 | Khan et al. |
| 2002/0143989 A1 | 10/2002 | Huitema et al. |
| 2002/0169890 A1 | 11/2002 | Beaumont et al. |
| 2003/0009587 A1 | 1/2003 | Harrow et al. |
| 2003/0101278 A1 | 5/2003 | Garcia-Luna-Aceves et al. |
| 2003/0204619 A1 | 10/2003 | Bays |
| 2005/0041591 A1* | 2/2005 | Duggi et al. .................. 370/238 |
| 2005/0047353 A1 | 3/2005 | Hares |
| 2005/0152333 A1* | 7/2005 | Smith ........................... 370/351 |
| 2007/0153764 A1* | 7/2007 | Thubert et al. ................ 370/351 |
| 2007/0294422 A1 | 12/2007 | Zuckerman et al. |
| 2008/0133767 A1 | 6/2008 | Birrer et al. |
| 2008/0256175 A1 | 10/2008 | Lee et al. |
| 2009/0106393 A1 | 4/2009 | Parr et al. |
| 2009/0144416 A1 | 6/2009 | Chatley et al. |
| 2009/0144422 A1 | 6/2009 | Chatley et al. |
| 2010/0125643 A1 | 5/2010 | Gerber et al. |

* cited by examiner

INTERDOMAIN NETWORK AWARE PEER-TO-PEER PROTOCOL

CROSS REFERENCE TO RELATED APPLICATIONS

This application is a continuation of U.S. patent application Ser. No. 12/271,014, entitled "Interdomain Network Aware Peer-to-Peer Protocol," filed on Nov. 14, 2008, the disclosure of which is hereby expressly incorporated by reference in its entirety.

FIELD OF THE DISCLOSURE

The present disclosure generally relates to communications networks, and more particularly relates to systems and methods for interdomain network aware peer-to-peer protocol.

BACKGROUND

Peer-to-peer (P2P) networks use diverse connectivity between participants in a network and the cumulative bandwidth of network participants, rather than conventional centralized resources where a relatively low number of servers provide a service or application. A pure P2P network does not have traditional clients or servers, but only equal peer nodes that simultaneously function as both "clients" and "servers" to the other nodes on the network.

P2P networks can be useful for sharing content files containing audio, video, or other data in digital format. It is estimated that P2P file sharing, such as BitTorrent, represents greater than 20% of all broadband traffic on the Internet.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
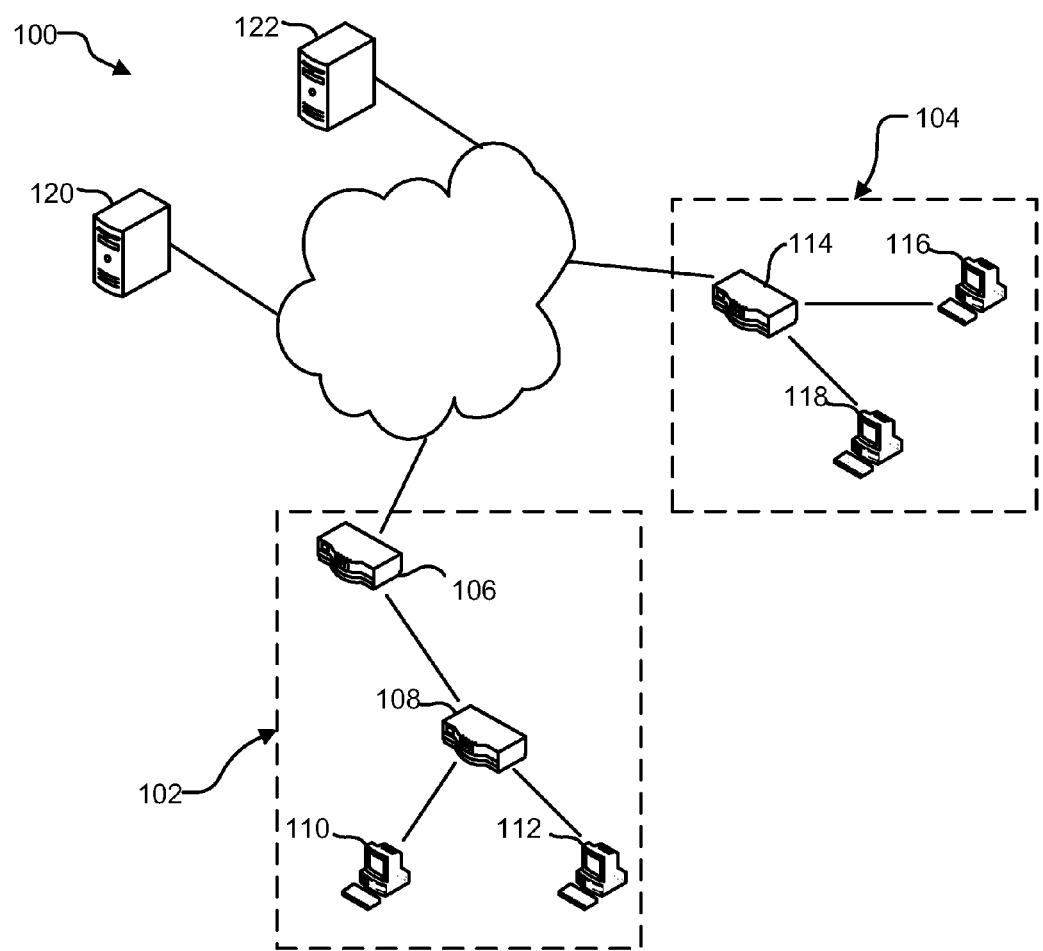
FIG. 1 is a block diagram illustrating a communications network in accordance with one embodiment of the present disclosure.

FIG. 1 shows a communications network 100, such as the Internet. Communications network 100 can include autonomous systems (ASs) 102 and 104. AS 102 can include routers 106 and 108 that communicate with each other and communicate with the rest of communication network 100 through a peering link at router 106. Additionally, AS 102 can include peer systems 110 and 112 that are connected to the communications network 100 through router 108. Similarly, AS 104 can include router 114 and peer systems 116 and 118. Peer systems 116 and 118 can be connected to the rest of communications network 100 through a peering link at router 108. Peer systems 110, 112, 116, and 118 can form a P2P file-sharing network. In a P2P file-sharing network, for example, peer system 110 can request a data file from peer system 118. When peer system 118 has the data file, peer system can provide the data file to peer system 118.

In an embodiment, communications network 100 can include a network-mapping server 120 and P2P server 122. ASs 102 and 104 can provide network-mapping server 120 with information about the network, including network distance information between systems. For example, AS 102 can provide a network distance between peer system 110 and 112 and network distances from each of peer system 110 and 112 to the peering link at router 106. The network-mapping server 120 can combine the network distance information provided by ASs 102 and 104 to obtain network distance information between pairs of peer systems in communications network 100. The P2P network can use the network distance information to identify relatively close peers to more efficiently transfer data files and other content. For example, if peer system 110 requests a data file and both peer systems 112 and 118 can provide the data file, the network distance information can be used to direct peer system 110 to preferentially obtain the data file from peer system 112 thereby reducing network costs and the time required for peer system 110 to retrieve the data file.

P2P server 122 can maintain a list of peer systems that can provide at least a portion of a data file or other content. A peer system, such as peer system 110 can request information from P2P server 122 about which peer systems can provide the content. The P2P server 122 can provide peer system 110 with a list of peers that can provide the data file. In an embodiment, the P2P server 122 can use network distance information provided by network-mapping server 120 to provide peer system 110 with a list of closest peers that can provide the content. In an alternate embodiment, the P2P server 122 can provide the peer system 110 with the list of peers and peer system 110 can use network distance information provide by network-mapping server 120 to identify a closest peer that can provide the content. Once peer system 110 has received the content, the peer system 110 can notify P2P server 122 that the content can be provided by peer system 110.

Figure 2:
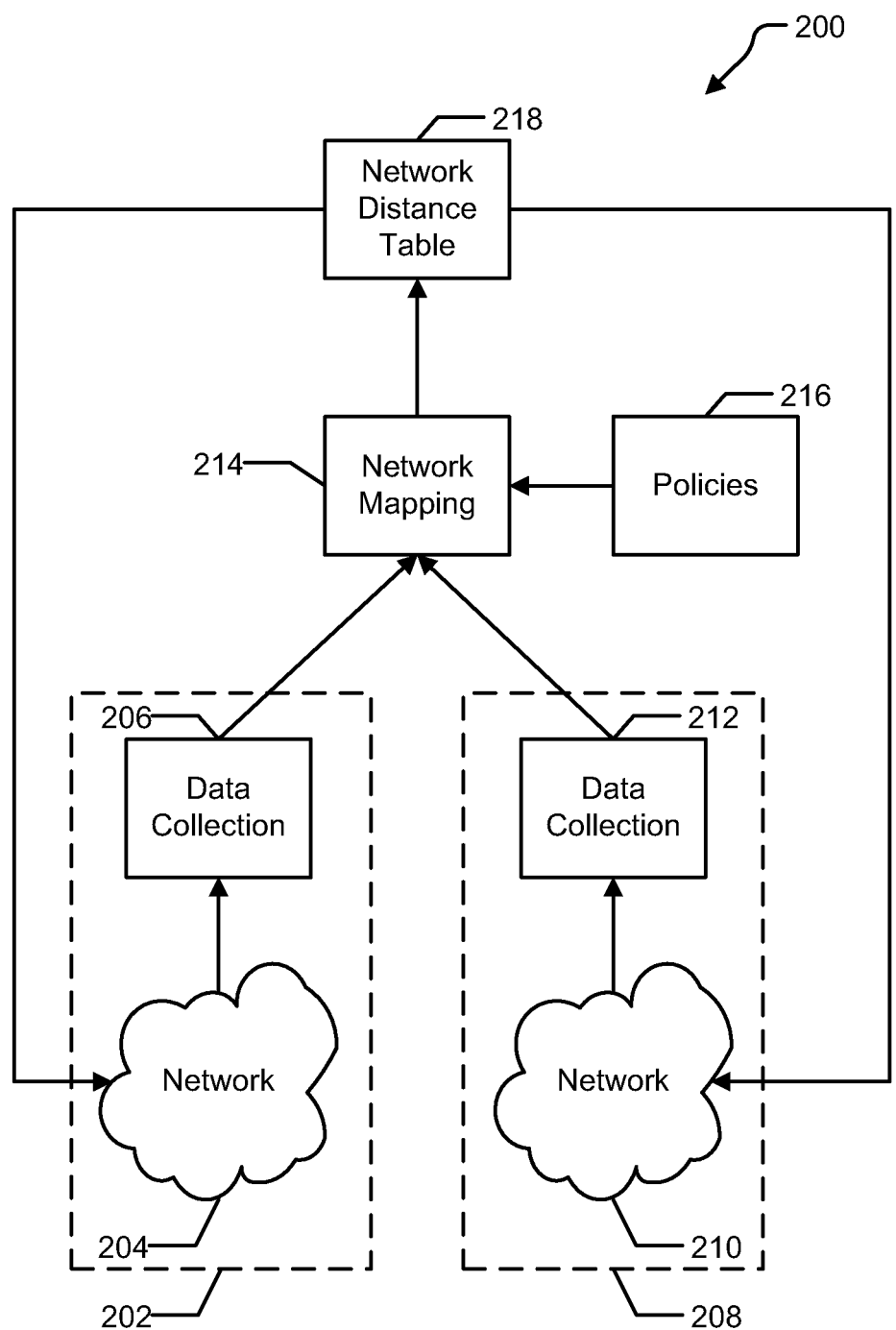
FIG. 2 is a block diagram illustrating a system for determining network distances in accordance with one embodiment of the present disclosure.

FIG. 2 illustrates a system 200 for determining network distances. A service provider 202 can have a network 204 including a number of endpoints and at least one peering point. The endpoints may be individual systems or may be a router or firewall providing network address translation for one or more systems. Additionally, service provider 202 can have a data collection module 206 that obtains network distance information for endpoints in network 204. Similarly, a service provider 208 can have a network 210 including a number of endpoints and a data collection module 212 that obtains network distance information for endpoints in network 210.

The system 200 can include a network-mapping module 214. Network-mapping module 214 can receive network distance information from data collection modules 206 and 208. Additionally, the network-mapping module 214 may receive policies 216. The policies 216 may indicate preferred routes. For example, Border Gateway Protocol (BGP) information may be used to define preferred routes between networks 204 and 210. Additionally, the policies 216 may define methods of combining different network distance information. In an embodiment, service provider 202 may utilize a different method than service provider 208 for obtaining or determining network distance information. For example, service provider 202 may utilize network latency measurements and service provider 208 may utilize number of hops to provide network distance information. As such, policies 216 may define a scaling factor to utilize when combining the network distance information from service providers 202 and 208.

The network-mapping module 214 can combine the network distance information from each service provider 202 and 208 to obtain a network distance table 218. The network distance table 218 can include network distance information for respective pairs of endpoints located throughout networks 204 and 210. At least a portion of network distance table 218 can be provided to each of service providers 202 and 208. In an embodiment, a portion of the network distance table 218 may be provided to peer systems within networks 204 and 210. The network distance table can be used to select endpoints with relatively small network distances, such as for P2P file sharing.

Figure 3:
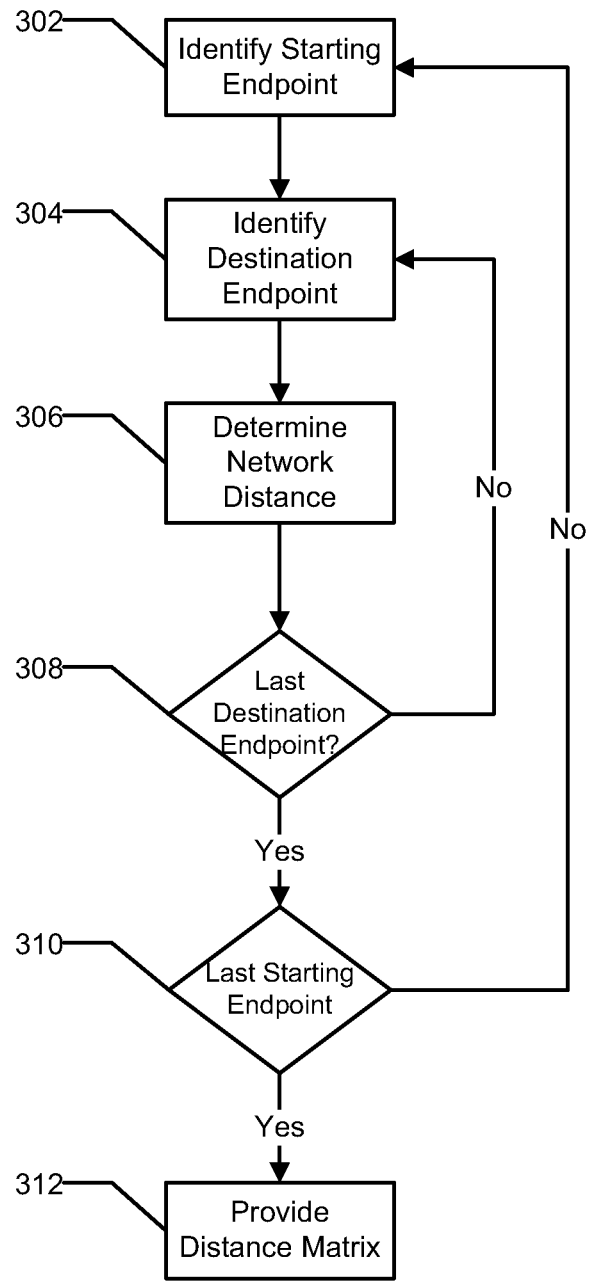
FIG. 3 is a flow diagram illustrating an exemplary method for providing network distances.

FIG. 3 shows a method of determining network distances. At 302, a starting endpoint in an AS can be identified. The endpoint can be a client system, such as client system 110, or a peering point, such as router 106. Alternatively, the endpoint can be a terminal router, such as router 106, which provides connectivity to multiple client systems. At 304, a destination endpoint in the AS can be identified. At 306, the network distance between the starting endpoint and the destination endpoint can be determined. The network distance can include the network cost, the bandwidth of the network links between the two endpoints, the number of hops between the two endpoints, the roundtrip time between the two endpoints, or any combination thereof. In an embodiment, routing tables including the preferred paths between the two endpoints can be used to identify the network distance. In another embodiment, a router along the path between the two endpoints can determine the network distance from the router to each endpoint. For example, the router may collect information about network traffic to and from each endpoint. The network distance between the two endpoints can be determined by combining the network cost from the router to each endpoint. Further, a map can be made of the network using information from a plurality of routers in the AS. The map can include a network distance for each link in the network and the network distance between the two endpoints can be determined by summing the network distance of each link along a preferred path between the two endpoints.

At 308, the system can determine if there are any additional destination endpoints. When there are additional destination endpoints, another destination endpoint can be selected, as illustrated at 304. Alternatively, when there are no additional destination endpoints, the system can determine if there are any additional starting endpoints, as illustrated at 310. When there are additional starting endpoints, the system can identify another starting endpoint at 302. Alternatively, the system can provide a distance matrix such as to the network-mapping server 120, as illustrated at 312.

Figure 4:
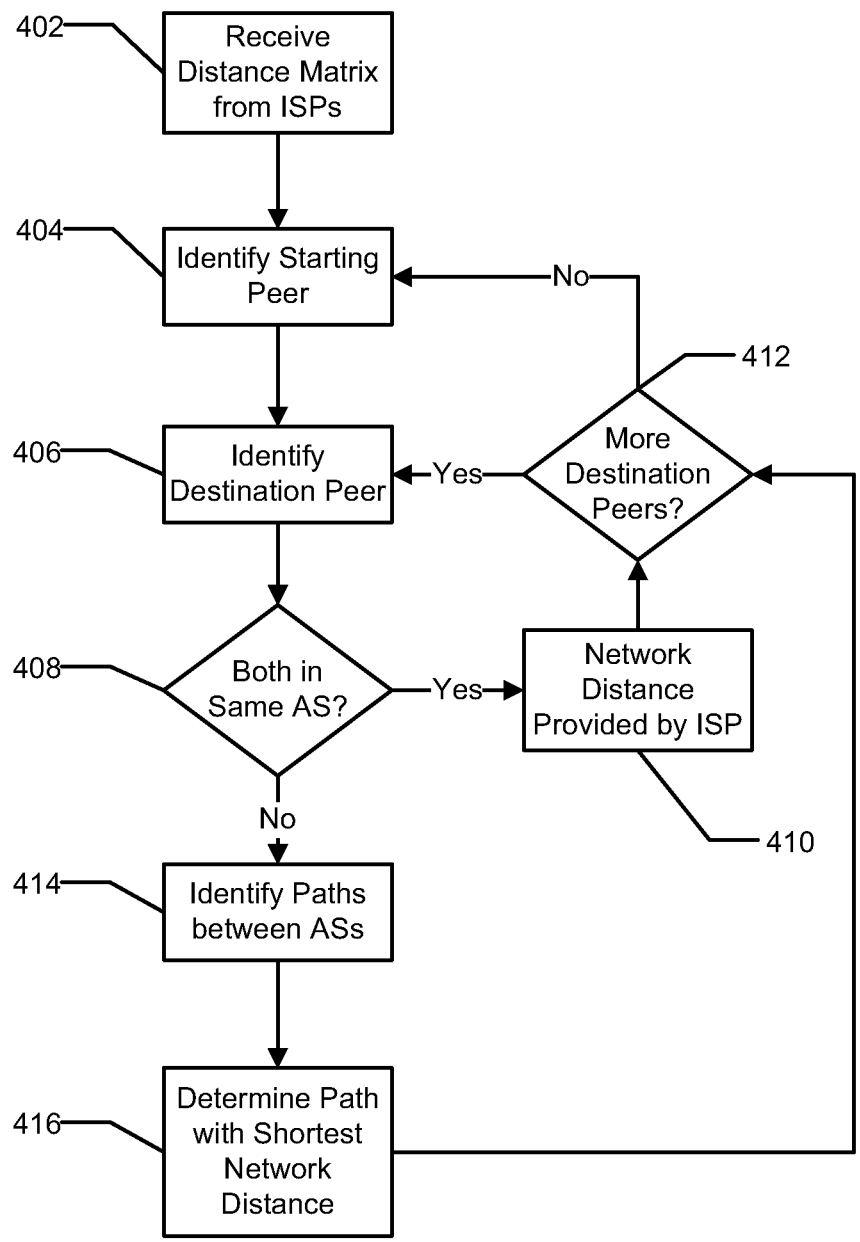
FIG. 4 is a flow diagram illustrating an exemplary method for combining network distances from multiple sources.

FIG. 4 illustrates an exemplary method of combining network distance information. At 402, a plurality of distance matrices can be received from a plurality of service providers by a mapping module, such as network-mapping server 120. The distance matrices can include network distance information between endpoints within each service provider's network. At 404, a starting peer can be identified and at 406, a destination peer can be identified. Each peer can be a peer system such as peer system 110. At 408, the mapping module can determine if both peers are within the same service provider network. When both peers are in the same service provider's network, the network distance between the two peers can be the network distance provided by the service provider, as illustrated at 410. At 412, the mapping module can determine if there are any additional destination peers. When there are additional destination peers, the mapping module can select another destination peer at 406. Alternatively, the mapping module can select another starting peer at 404.

Returning to 408, when both peers are not within the same service provider network, the mapping module identifies possible pathways between the peers, as illustrated at 414. The possible pathways can include pathways that cross peering points directly connecting the two service providers' networks and pathways that travel across additional networks to connect the two service providers' networks. In an embodiment, policies can be used to indicate preferred paths. For example, a service provider may have a primary peering point that is preferred over a secondary peering point. A policy may indicate that the network distance should be calculated using a path through the primary peering point rather than a path through a secondary peering point. Any path through the secondary peer can be excluded from further consideration.

At 416, the mapping module can determine the path with the shortest network distance and use that network distance as the network distance between the peers. In an embodiment, the paths between the two peers may be asymmetric. For example, traffic from the starting peer may travel through a peering point close to the starting peer and distant from the destination peer while traffic from the destination peer may travel through a peering point close to the destination peer and distant from the starting peer. The mapping module can calculate the network distance separately for the two directions. At 412, the mapping module can determine if there are any additional destination peers.

Figure 5:
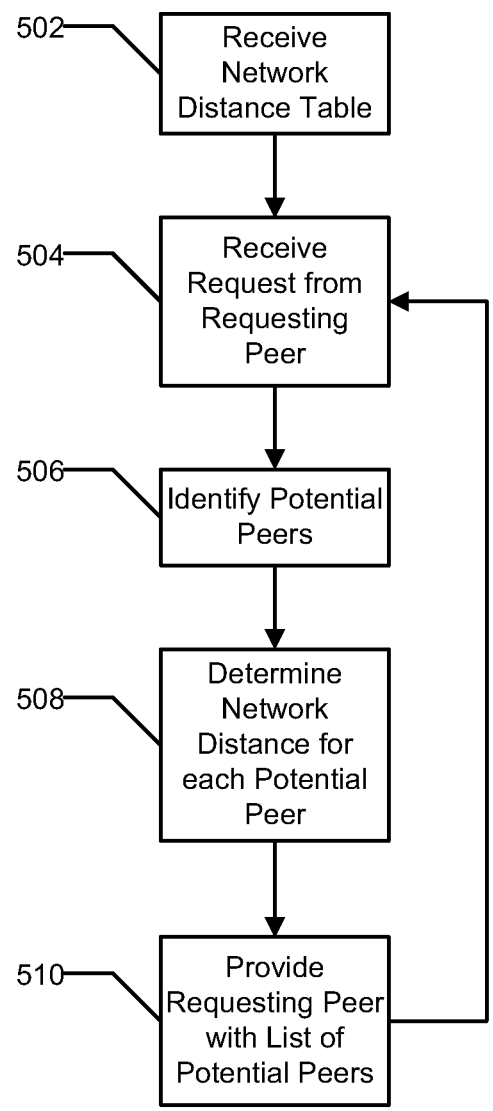
FIG. 5 is a flow diagram illustrating an exemplary method for P2P file sharing.

FIG. 5 illustrates an exemplary embodiment of a method for selecting an optimal peer for providing content. At 502, a P2P server can receive a network distance table. The P2P server can be a server that provides a peer with a list of other peers for downloading content. For example, a BitTorrent tracker can provide a peer with a list of peers having at least a portion of the content. In another example, the P2P server may provide a peer with a list of neighbor peers to connect to for joining the P2P network.

At 504, the P2P server can receive a request from a peer. At 506, the P2P server can identify potential peers, such as peers that have the requested content. At 508, the P2P server can determine the network distance between the requesting peer and each potential peer. When the network distance is asymmetric, the P2P server may utilize a network distance from the requesting peer, a network distance from the potential peer, an average of the network distances, or any combination thereof. In an embodiment, the network distance from the potential peer may be preferred as a larger amount of traffic can travel from the potential peer while downloading content.

At 510, the P2P server can provide the requesting peer with a list of peers with the smallest network distance. In an embodiment, the list of peers may be ranked by network distance. At 504, the P2P server can receive another request.

Figure 6:
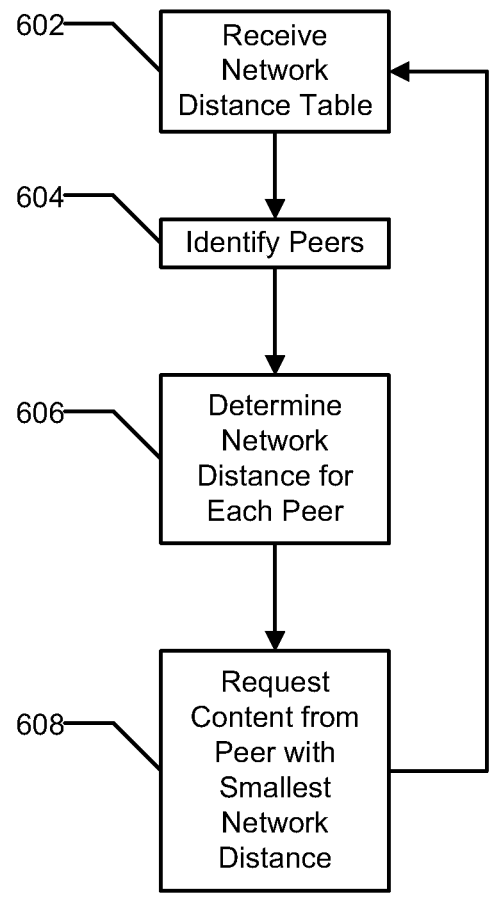
FIG. 6 is a flow diagram illustrating another exemplary method for P2P file sharing.

FIG. 6 illustrates another exemplary embodiment of a method for selecting an optimal peer for providing content. At 602, a peer system, such as peer system 110 can receive a network distance table. The network distance table may be a partial network distance table including only network distance information related to the peer system. Additionally, the network distance table may only include network distance information for relatively close peers, such as peers having a network distance below a threshold. In an embodiment, the network distance table may include only network distance information from an endpoint to the peer system.

At 604, the peer system can identify peers that may have desired content. The peer system can send a request to a P2P server to identify potential peers having desired content. Alternatively, the peer system may broadcast a request to the P2P network to identify peers having the desired content. At 606, the peer system can determine the network distance for each peer having the desired content. When the network distance is asymmetric, the peer system may utilize a network distance to the potential peer, a network distance from the potential peer, an average of the network distances, or any combination thereof. In an embodiment, the network distance from the potential peer may be preferred as a larger amount of traffic can travel from the potential peer while downloading content. At 608, the peer system may request the desired content from the potential peer with the smallest network distance. Alternatively, the peer system may request portions of the desired content from a number of potential peers having a relatively small network distance.

In an embodiment, when the network distance table does not include distance information for a potential peer, the peer system may assume that the potential peer is a distant potential peer. Distant potential peers can have a network distance above a threshold. The peer system may utilize distant potential peers only when no non-distant potential peers are identified.

Figure 7:
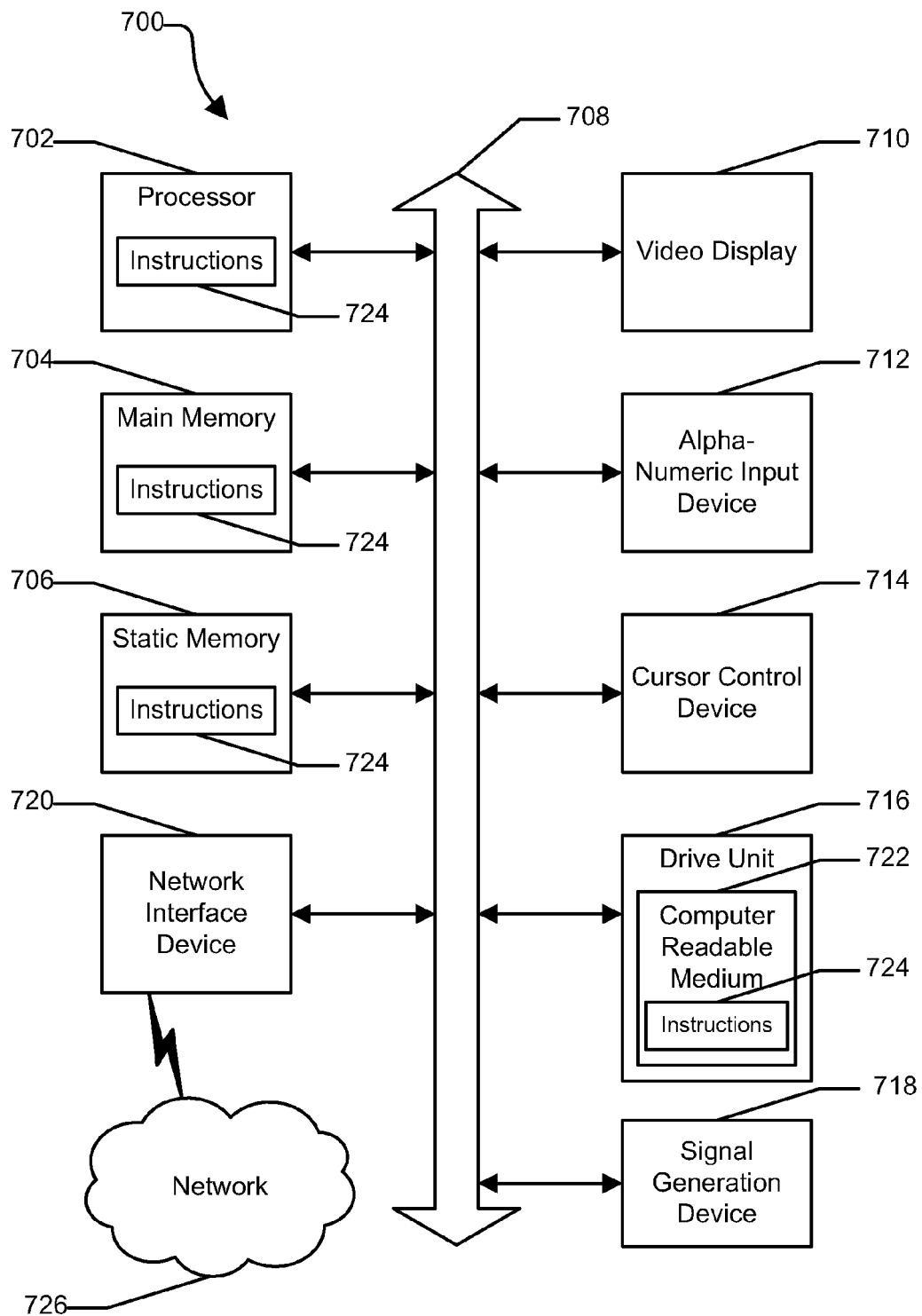
FIG. 7 is an illustrative embodiment of a general computer system.

FIG. 7 shows an illustrative embodiment of a general computer system 700. The computer system 700 can include a set of instructions that can be executed to cause the computer system to perform any one or more of the methods or computer based functions disclosed herein. The computer system 700 may operate as a standalone device or may be connected, such as by using a network, to other computer systems or peripheral devices.

In a networked deployment, the computer system may operate in the capacity of a server or as a client user computer in a server-client user network environment, or as a peer computer system in a P2P (or distributed) network environment. The computer system 700 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710 such as a liquid crystal display (LCD), an organic light emitting diode (OLED), a flat panel display, a solid-state display, or a cathode ray tube (CRT). Additionally, the computer system 700 may include an input device 712 such as a keyboard, and a cursor control device 714 such as a mouse. Alternatively, input device 712 and cursor control device 714 can be combined in a touchpad or touch sensitive screen. The computer system 700 can also include a disk drive unit 716, a signal generation device 718 such as a speaker or remote control, and a network interface device 720 to communicate with a network 726. In a particular embodiment, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
   obtaining network distance information including a compilation of network distance information provided by a plurality of service providers;
   storing the network distance information in a network distance table;
   receiving a request from a client for an identity of a peer providing content;
   identifying a first peer and a second peer providing the content;
   determining a first network distance between the first peer and the client and a second network distance between the second peer and the client;
   determining that the first peer and the second peer are both distant potential peers to the client based on the first network distance and the second network distance not being included in the network distance table, wherein the distant potential peers have a network distance above a threshold;
   utilizing the distant potential peers when no non-distant potential peers are identified; and
   providing the identity of the first peer to the client.

2. The method of claim 1 wherein the network distance information is selected from a group consisting of network cost, bandwidth, number of hops, roundtrip time, and any combination thereof.

3. The method of claim 1 wherein providing includes providing a list of peers based on the network distance between the peers and the client.

4. The method of claim 3 wherein the list of peers is sorted by network distance for each peer.

5. The method of claim 1 further comprising:
   obtaining policy information for first and second autonomous systems; and
   storing the policy information for the first and second autonomous systems in the network distance table.

6. The method of claim 5 wherein the policy information includes a scaling factor for combining the compilation of network distance information provided by the service providers.

7. The method of claim 5 wherein the policy information indicates preferred routes between the autonomous systems.

8. A system comprising:
   a memory including a network distance table having network distance information including a compilation of network distance information provided by a plurality of service providers; and
   a processor configured to:
      receive a request from a client for an identity of a peer providing content;
      identify a first peer and a second peer providing the content;
      determine a first network distance between the first peer and the client and a second network distance between the second peer and the client;
      determine that the first peer and the second peer are both distant potential peers to the client based on the first network distance and the second network distance not being included in the network distance table, wherein the distant potential peers have a network distance above a threshold;
      utilize the distant potential peers when no non-distant potential peers are identified; and
      provide the identity of the first peer to the client.

9. The system of claim 8 wherein the network distance information is selected from a group consisting of network cost, bandwidth, number of hops, roundtrip time, and any combination thereof.

10. The system of claim 8 wherein the processor is configured to provide the identity by providing a list of peers based on the network distance between the peers and the client.

11. The system of claim 10 wherein the list of peers is sorted by network distance of each peer.

12. The system of claim 8 wherein the memory further includes policy information for first and second autonomous systems.

13. The system of claim 12 wherein the policy information includes a scaling factor for combining the compilation of network distance information provided by the service providers.

14. The system of claim 12 wherein the policy information indicating preferred routes between the autonomous systems.

15. An apparatus comprising:
   a processor; and
   a memory having instructions to manipulate the processor, the instructions comprising:
      instructions to obtain network distance information including a compilation of network distance information provided by a plurality of service providers;
      instructions to store the network distance information in a network distance table;
      instructions to identify a first peer and a second peer providing content;
      instructions to determine a first network distance between the first peer and the client and a second network distance between the second peer and the client;
      instructions to determine that the first peer and the second peer are both distant potential peers to the client based on the first network distance and the second network distance not being included in the network distance table, wherein the distant potential peers have a network distance above a threshold;
      instructions to utilize the distant potential peers when no non-distant potential peers are identified;
      instructions to send a request for content from the device to the first peer; and
      instructions to receive the content at the device from the first peer.

16. The apparatus of claim 15 wherein the network distance information is selected from a group consisting of network cost, bandwidth, number of hops, roundtrip time, and any combination thereof.

17. The apparatus claim 16 wherein the network distance information includes the network distance from the first and second peers to the device.

18. The apparatus of claim 15 wherein the network distance information includes the network distance to the first and second peers from the device.

19. The apparatus of claim 15 wherein the plurality of instructions further comprise:
   instructions to obtain policy information for first and second autonomous systems; and
   instructions to store the policy information for the first and second autonomous systems in the network distance table.

20. The apparatus of claim 19 wherein the policy information includes a scaling factor for combining the compilation of network distance information provided by the service providers.

* * * * *